Patented May 2, 1939

UNITED STATES PATENT OFFICE 2,156,593

2,156,593

MONOAZO-DYESTUFFS AND A PROCESS FOR THEIR MANUFACTURE

Adolf Krebser, Riehen, near Basel, Switzerland, assignor to the firm of J. R. Geigy S. A., Basel, Switzerland No Drawing. Application February 18, 1937, Serial No. 126,524. In Switzerland March 5, 1936

12 Claims. (Cl. 260—198)

According to this invention new, valuable monoazo-dyestuffs are made by combining a 2-alkoylamino-, -aroylamino-, -aralkoylamino- or -arylsulphonylamino-5-hydroxynaphthalene-1,7-disulphonic acid with a diazo-compound of an ortho- or para-aminophenol-aralkyl- or aryl ether or a derivative thereof, substituted in meta- or para-position to the ether group by a further aralkoxy- or aryloxy-group (aminoresorcinol and aminohydroquinone ethers). The amines used as diazo components may also be further substituted in the nucleus by alkyl or halogen or an acylamino-, aroylamino-, or aracylamino-group, or a sulphonic acid or sulphonic acid amide radical; in the latter case the amide-group may be unsubstituted or substituted once or twice.

The new dyestuffs are distinguished from known similar dyestuffs obtained from the same diazo components and 1-acidylamino-8-hydroxynaphthalenemono- and disulphonic acids in part by better fastness to alkali and in part by greater purity and brightness of the shade and so on, and by a shifting of the shade towards yellow-red.

The following examples illustrate the invention, the parts being by weight:—

Example 1

39.8 parts of 1-amino-2-(2'-methyl)-phenoxybenzene are diazotized in the usual manner and coupled in solution alkaline with ammonia with 86 parts of 2-benzoylamino-5-hydroxynaphthalene-1,7-disulphonic acid prepared by benzoylating 2-amino-5-hydroxynaphthalene-1,7-disulphonic acid according to known methods in presence of sodium acetate. When formation of the dyestuff is finished the dyestuff is worked up in the usual manner.

The new dyestuff is a red powder which is soluble in water to a yellow-red, in concentrated sulphuric acid to a violet solution. It dyes wool and silk very pure, bright, yellow-red shades of very good fastness properties such as fastness to light, fulling and sea-water.

If in the foregoing example instead of 1-amino-2-(2'-methyl)-phenoxybenzene there is used another ortho-amino-diaryl ether, for example 1-amino-2-phenoxybenzene, 1-amino-2-(3'- or 4'-methyl)-phenoxybenzene, 1-amino-2-(4'-chloro)-phenoxybenzene or the corresponding derivatives of para-aminophenol or analogous aminophenol ethers further substituted in the nucleus, for example 1-amino-4-chloro-2-phenoxybenzene, dyestuffs with similar properties are obtained.

Instead of benzoylated 2-amino-5-hydroxynaphthalene-1,7-disulphonic acid compounds substituted in the benzoyl residue may be used, such as halogenbenzoyl or other acidyl derivatives of this aminonaphthol-disulphonic acid. There may be named, for example, 2-(4'-methylphenyl)-sulphonylamino-, 2-phenylsulphonylamino-, 2-acetylamino-, 2-chloracetylamino-, 2-phenylacetylamino-, 2-phenoxy-acetylamino-5-hydroxynaphthalene-1,7-disulphonic acid and so on. The new dyestuffs have similar properties of fastness; the shade varies in the direction of yellow or blue, depending on the acidyl-group used in each particular case.

Example 2

A diazo solution prepared in the usual manner from 23.4 parts of 4-chloro-2-aminophenol-benzyl ether is added slowly to an ice-cold aqueous solution of 46 parts of 2-phenylsulphonylamino - 5 - hydroxynaphthalene-1,7-disulphonic acid and 25 parts of sodium acetate, and a cold solution of sodium carbonate is simultaneously added in such a manner that the reaction always remains approximately neutral. The whole is stirred until the formation of the dyestuff is finished and the dyestuff is then isolated in the usual manner by precipitation with common salt and dried.

The new dyestuff is a red powder which dissolves in water with a yellow-red and in concentrated sulphuric acid with a violet coloration. It dyes wool and silk pure, bright, red shades.

Instead of the benzyl ether above named there may be used a substitution product thereof, such as the para-chlorobenzyl ether of 4-chloro-2-aminophenol or of the aminophenol free from halogen. The same is true in the case of para-aminophenol whose benzyl and 4-chlorobenzyl ethers likewise come into question. More bluish dyestuffs are obtained from the corresponding alkyl ethers such as the methyl and ethyl ethers.

The variation in the acidyl-group of the 2-amino-5-hydroxynaphthalene - 1,7 - disulphonic acid indicated in Example 1 may also be adopted here with corresponding results.

Example 3

36.8 parts of 1-amino-2-phenoxybenzene-5-sulphonic acid-N-ethylanilide are diazotized in the usual manner and the diazo solution is added slowly at 0° C. to an aqueous solution, containing an excess of sodium acetate, of 47.3 parts of 2-(4' - methylphenyl) - sulphonylamino - 5 - hydroxynaphthalene-1,7-disulphonic acid (the latter compound prepared by reaction of the corresponding aminonaphtholdisulphonic acid with para-toluenesulphochloride according to the usual method). Formation of the dyestuff is carried to an end by gradual addition of a sodium carbonate solution and the dyestuff is salted out, filtered and dried.

The dyestuff is a red powder soluble in water to a bright red solution. It dyes wool and silk very beautiful, bright red shades of very good fastness to light, fulling and sea-water.

Quite similar dyestuffs are obtained if instead of the 5-sulphonic acid-N-ethylanilide above mentioned there are used similar derivatives of ortho-aminophenol, for example 1-amino-2-phenoxylbenzene- or 1-amino-2-[(4'-chloro-)-phenoxybenzene]-5-sulphonic acid amide or -5-sulphonic acid anilide, -5-sulphonic acid toluidide or -5-sulphonic acid-N-alkyltoluidides, -5-sulphonic acid benzyl- or -N-alkylbenzylamides or 1-amino-2-cresoxy-5-sulphonic acid amides or substitution products of any of these. The same is true in the case of the corresponding, similarly constituted compounds derived from para-aminophenol.

By variation of the acidyl-group in the coupling component, of which some possibilities are indicated in Example 1, the shade of the dyestuff may be influenced in a manner similar to that given in Example 1.

*Example 4*

27.7 parts of 1-amino-2,4-diphenoxybenzene are diazotized in the usual manner and coupled at 0° C. in an aqueous solution alkaline with ammonia with 43 parts of 2-benzoylamino-5-hydroxynaphthalene-1,7-disulphonic acid whilst well stirring. When formation of the dyestuff is finished it is worked up in the usual manner.

The new dyestuff is a red powder which dissolves in boiling water with a bluish-red and in concentrated sulphuric acid with a violet coloration. It dyes wool and silk bright red shades; its dyeings on wool have good properties of fastness.

Instead of the above named 1-amino-2,4-diphenoxybenzene there may be used, for example, the corresponding 1-amino-2,4-di-(2',2''- or 4',4''-dimethyl- or 4',4''-dichloro)-phenoxybenzenes or the corresponding substitution products derived from ethers substituted in the aminoresorcinol nucleus, such as 5-chloro-1-amino-2,4-diphenoxybenzene, whereby quite similar dyestuffs are obtained.

Instead of the above named coupling component there may be used other 2-alkoylamino-, -aroylamino-, aralkoylamino- or -arylsulphonylamino-5-hydroxynaphthalene-1,7-disulphonic acids such as are enumerated, for instance, in Example 1.

Instead of the aminophenol ethers referred to in the foregoing examples, there may be used corresponding sulphonic acids, for example 1-amino-2-phenol-ether-4-sulphonic acids or 1-amino-4-phenolether-2-sulphonic acids.

What I claim is:

1. A process of preparing monoazo-dyestuffs, which consists in coupling a 2-acylamino-5-hydroxynaphthalene-1,7-disulphonic acid, in which acyl represents a radical selected from the group consisting of alkoyl, aroyl, aralkoyl and arylsulphonyl, with a diazo-compound of an amine of the general formula

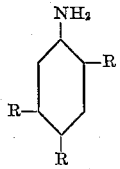

in which R represents a member of the group consisting of H, O-aralkyl and O-aryl, at least one and at most two members being different from H, including amines further substituted in the nucleus by substituents selected from the group consisting of alkyl, halogen, alkoylamino, aroylamino, aralkoylamino groups, sulphonic acid groups and sulphonic acid amide groups, of the formula

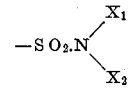

$X_1$ and $X_2$ being members selected from the group consisting of H, lower alkyl, benzyl and aryl radicals of the benzene series.

2. A process of preparing monoazo-dyestuffs, which consists in coupling a 2-acylamino-5-hydroxynaphthalene-1,7-disulphonic acid, in which acyl represents a radical selected from the group consisting of alkoyl, aroyl, aralkoyl and arylsulphonyl, with a diazo-compound of an amine of the general formula

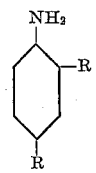

in which R represents a member selected from the group consisting of H, O-aralkyl and O-aryl, at least one member being different from H, including amines further substituted in the nucleus by substituents selected from the group consisting of alkyl, halogen, alkoylamino, aroylamino, aralkoylamino groups, sulphonic acid groups and sulphonic acid amide groups, of the formula

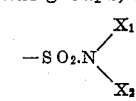

$X_1$ and $X_2$ being members selected from the group consisting of H, lower alkyl, benzyl and aryl radicals of the benzene series.

3. A process of preparing monoazo-dyestuffs, which consists in coupling a 2-acylamino-5-hydroxynaphthalene-1,7-disulphonic acid, in which acyl represents a radical selected from the group consisting of alkoyl, aroyl, aralkoyl and arylsulphonyl, with a diazo-compound of an amine of the general formula

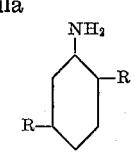

in which R represents a member selected from the group consisting of H, O-aralkyl and O-aryl, at least one member being different from H, including amines further substituted in the nucleus by substituents selected from the group consisting of alkyl, halogen, alkoylamino, aroylamino, aralkoylamino groups, sulphonic acid groups and sulphonic acid amide groups, of the formula

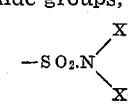

$X_1$ and $X_2$ being members selected from the group consisting of H, lower alkyl, benzyl and aryl radicals of the benzene series.

4. A process of preparing a monoazo-dyestuff, which consists in combining the diazo-compound of 1-amino-2-(2'-methyl)-phenoxybenzene with 2-benzoylamino-5-hydroxynaphthalene-1,7-disulphonic acid.

5. A process of preparing a monoazo-dyestuff, which consists in combining the diazo-compound of 4-chloro-2-aminophenolbenzyl ether with 2-phenylsulphonylamino - 5 - hydroxynaphthalene-1,7-disulphonic acid.

6. A process of preparing a monoazo-dyestuff, which consists in combining the diazo-compound of 1-amino-2,4-diphenoxybenzene with 2-benzoylamino - 5 - hydroxynaphthalene -1,7- disulphonic acid.

7. The monoazo-dyestuffs of the probable general formula of the dyestuff acid

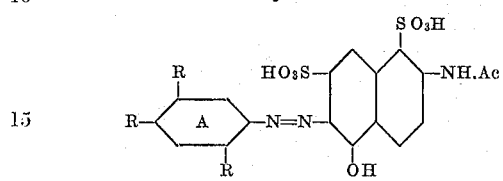

in which Ac represents an acyl radical selected from the group consisting of alkoyl, aroyl, aralkoyl and arylsulphonyl, and R a member selected from the group consisting of H, O-aralkyl and O-aryl, at least one and at most two members being different from H, including dyestuffs further substituted in the nucleus A by substituents selected from the group consisting of alkyl, halogen, alkoylamino, aroylamino, aralkoylamino groups, sulphonic acid groups and sulphonic acid amide groups, of the formula

$X_1$ and $X_2$ being members selected from the group consisting of H, lower alkyl, benzyl and aryl radicals of the benzene series.

8. The monoazo-dyestuffs of the probable general formula of the dyestuff acid

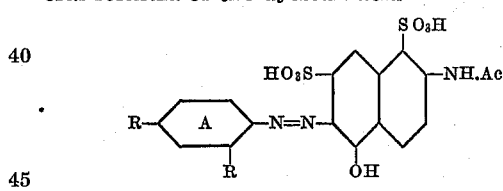

in which Ac represents an acyl radical selected from the group consisting of alkoyl, aroyl, aralkoyl and arylsulphonyl, and R a member selected from the group consisting of H, O-aralkyl and O-aryl, at least one and at most two members being different from H, including dyestuffs further substituted in the nucleus A by substituents selected from the group consisting of alkyl, halogen, alkoylamino, aroylamino, aralkoylamino groups, sulphonic acid groups and sulphonic acid amide groups, of the formula

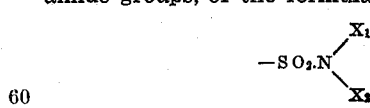

$X_1$ and $X_2$ being members selected from the group consisting of H, lower alkyl, benzyl and aryl radicals of the benzene series.

9. The monoazo-dyestuffs of the probable general formula of the dyestuff acid

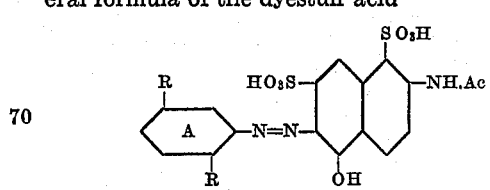

in which Ac represents an acyl radical selected from the group consisting of alkoyl, aroyl, aralkoyl and arylsulphonyl, and R a member selected from the group consisting of H, O-aralkyl and O-aryl, at least one and at most two members being different from H, including dyestuffs further substituted in the nucleus A by substituents selected from the group consisting of alkyl, halogen, alkoylamino, aroylamino, aralkoylamino groups, sulphonic acid groups and sulphonic acid amide groups, of the formula

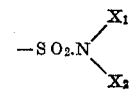

$X_1$ and $X_2$ being members selected from the group consisting of H, lower alkyl, benzyl and aryl radicals of the benzene series.

10. The monoazo-dyestuff 2-(2'-methyl)-phenoxybenzene - azo -2- benzoylamino -5- hydroxynaphthalene-1,7-disulphonic acid of the following formula

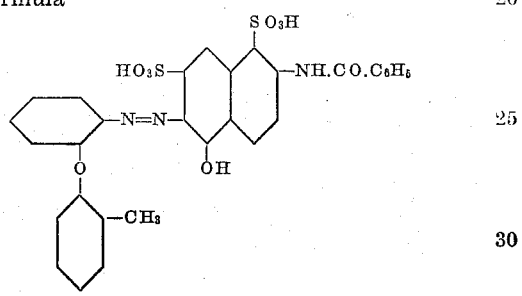

being a red powder soluble in water to a yellow-red solution and in concentrated sulphuric acid to a violet solution, and dyeing wool and silk very pure, bright yellow-red shades.

11. The monoazo-dyestuff 5-chloro-2-benzylphenoxybenzene-azo-2-phenylsulphonylamino-5-hydroxynaphthalene 1,7-disulphonic acid of the following formula

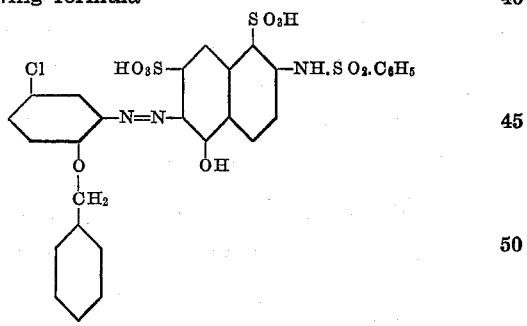

being a red powder soluble in water to a red and in concentrated sulphuric acid to a violet solution, and dyeing wool and silk pure, bright, red shades.

12. The monoazo-dyestuff 2:4-diphenoxybenzene - azo -2- benzoylamino -5- hydroxynaphthalene-1:7-disulphonic acid of the following formula

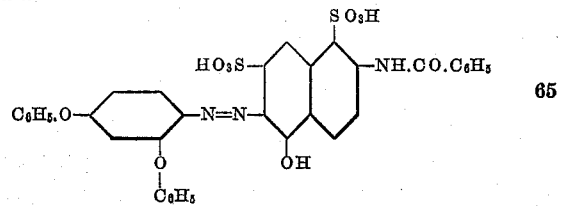

being a red powder soluble in boiling water to a bluish-red and in concentrated sulphuric acid to a violet solution and dyeing wool and silk bright red shades.

ADOLF KREBSER.